April 25, 1961  R. E. CARBAUH  2,981,939
FIRE DETECTOR SYSTEM
Filed Nov. 27, 1956
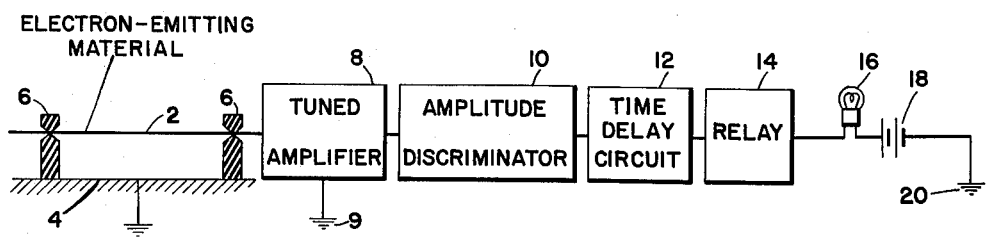
INVENTOR
ROBERT E. CARBAUH
BY *Scrivener and Parker*
ATTORNEY

United States Patent Office 2,981,939
Patented Apr. 25, 1961

2,981,939
FIRE DETECTOR SYSTEM

Robert E. Carbauh, Norfolk, Mass., assignor to Petcar Research Corporation, Medfield, Mass., a corporation of New Jersey Filed Nov. 27, 1956, Ser. No. 624,580

2 Claims. (Cl. 340—228)

This invention has to do with the art and field of fire detection and provides a fire detection system and method which relies on, and is operative by reason of, the quality or property of materials of emitting electrons when heated, which quality or property is known in the art as thermionic emission and is so referred to in this specification. In its preferred embodiment the invention also relies on, and is operative by reason of, the intermittent intensity, or "flicker," of a flame, which has been observed to occur at a frequency lying within a narrow range in the sub-audio spectrum.

The property or quality of materials known as thermionic emission has been observed in many materials and possibly exists to some extent in all materials. It exists in some materials to a very great degree and in other materials is negligible. The materials in which this effect exists in great degree are metals such as tungsten, thoriated tungsten, barium and its oxides and stainless steel, but there are other metals and materials which exhibit the property to a degree which is sufficient to be useful in systems according to this invention. Other materials exhibit the property in a lesser degree and while it may be observable in these materials they do not exhibit it to a sufficient degree to make them useful in systems according to the invention. In this specification and the appended claims, materials which are useful in systems according to the invention are referred to as "materials having a substantial thermionic emission property." In accordance with the invention a sensing element or electrode is formed of such a material and is placed within a space which is to be monitored for the presence of flame.

It is well known that a flame produces a so-called "flicker" by which is meant that the upper portion of the luminous zone of the flame rises to a maximum height at a substantially constant frequency, while the lower portion of the flame has a continuous existence, but periodically gives off another flame which rises above the main flame during its short period of existence. A discussion of the flicker characteristics of flame may be found in "Industrial and Engineering Chemistry," volume 20, No. 10, at page 1013, issued in October 1928. This physical flicker of flame is accompanied by a periodic variation, or "flicker," in the heat of the upper or outer portion of the flame which occurs at the same frequency as the physical flicker referred to in the article cited above. In any event, the physical flicker and the correspondingly varying characteristics of a flame, such as the temperature of its outer portion, are known to have a frequency in the range of 2 to 30 c.p.s. with predominant frequencies in the range of 10 to 15 c.p.s.

It has been found that thermionic emission will occur in an emitting material when the material is subjected to the direct impingement of a flame or when the flame is so close to the material that it is subjected to the flickering or flickering heat of the flame. Under either of these conditions a voltage will be produced in the emitting material which will vary, i.e. have a frequency, at the rate of flame flicker which, as stated, has been found to be in the range of 2 to 30 c.p.s. with predominant frequencies in the range of 10 to 15 c.p.s.

In this invention I have made use of the property of certain materials to emit electrons when heated and, in addition and combination, the flicker property or effect of flame, to provide a device or system which is operative when flame impinges or is closely adjacent to a sensing element formed of emitting material to produce a signal.

The single figure of the drawings forming part of this specification is a block diagram of a system according to the invention which is operable to detect flame impinging on, or being closely adjacent to, the sensing element.

A flame detector system according to a preferred form of the invention is disclosed in the drawing and comprises a sensing element or electrode 2 which is insulated from ground 4, as by being mounted on stand-off insulators 6 which are preferably formed of high temperature resistant material. This sensing element is shown in the drawing in the form of a bare wire but may be a tube, mesh, screen, ribbon or the like. In all cases, however, the sensing element is formed of a material which emits electrons when heated, as when a flame impinges on the element or is so closely adjacent to it that the sensing element is subjected to the flicker effect of the flame, or when the ambient temperature at the sensing element is increased. The sensing element may accordingly be formed of such materials as tungsten, thoriated tungsten, nickel-chromium alloy, stainless steel and the like. No electrical current, either A.C. or D.C., is supplied to the sensing element and it is connected to a tuned amplifier 8 which is grounded at 9. This amplifier is tuned to admit frequencies in the sub-audio range of the frequency of a flicker of a flame and therefore may be tuned to frequencies in the range of 2 to 30 c.p.s. However, if it is known that the sensing element will be exposed only to flame having flicker characteristics in the observed range of flame flicker the tuned amplifier 8 may be tuned to accept and amplify only frequencies within this range. For example, if the sensing element is to be used in a place, such as an aircraft, in which it is necessary or desirable to detect the presence of flame resulting from the combustion of gasoline, kerosene, oil or the like, and having flicker characteristics in the 10 to 15 c.p.s. range, the tuned amplifier 8 may advantageously be tuned to this narrow band.

To minimize the effect of inherent circuit noise in the tuned amplifier 8, an amplitude discriminator 10 is introduced at the output of the tuned amplifier and this amplitude discriminator may be a cathode-coupled bistable multi-vibrator. When the input voltage to the discriminator exceeds a predetermined voltage level, which can be determined by adjusting a grid bias control, the multi-vibrator changes from one stable state to the other, returning to the first state only when the input voltage is reduced below a selected level. The bias control is set so that inherent circuit noise does not exceed the predetermined level, while the voltage developed due to the presence of a flame exceeds the predetermined level causing a pulse to be developed. Thus the effects of inherent circuit noise and low-level spurious voltages are minimized.

The output wave from the amplitude discriminator is coupled to a time delay circuit 12, which may be a counting-rate circuit, which causes the square waveform output of the discriminator to be changed to narrow pulses of constant width and amplitude as the RC time constant is relatively small. These pulses charge a Miller-type integrator which has a high resistance in shunt. When the rate of occurrence of pulses is low, the charge on the capacitor forming part of the integrating circuit leaks off. However, when the pulse rate is increased the charge on the capacitor does not leak off causing a D.C. voltage to be developed, the amplitude of which is directly proportional to the applied pulse rate. In this manner the effect of low frequency spurious responses are minimized.

The output of the time delay or circuit is coupled to a normally open relay 14. As the voltage output of the time delay circuit is a function of frequency, the relay is adjusted to operate at a pre-determined voltage which corresponds to a counting rate within the range of frequency of flame flicker to which the tuned amplifier 8 is adjusted. Operation of the relay connects an indicating device 16, such as a lamp, to a source of electric energy 18, which is grounded at 20, to energize the indicating device.

In the use and operation of the described system the sensing element 2 is placed within, or trained through, a space which is to be monitored for flame and is supported therein on insulators 6. No electric energy is supplied to the sensing element. If flame impinges on the sensing element, or is so closely adjacent to the sensing element that the element is subjected to the flicker effect of the flame, the material of the sensing element emits electrons, and if the flame bridges the sensing element and ground a voltage will be developed between the sensing element and ground having a frequency determined by the frequency of flicker of the flame, which frequency is within the range to which the amplifier 8 is tuned. The thermionic current produced by this voltage is amplified at 8 and supplied to the amplitude discriminator 10 and time delay circuit 12. Signals due to phenomena other than flame-produced thermionic emission in the sensing element 2, such as spurious line noises, lightning, electrically charged rain and the like will be eliminated by the circuit elements 8, 10, 12. Signals due to thermionic emission in the sensing element will be accepted and amplified by the tuned amplifier 8 and will be passed by the amplitude discriminator 10 and time delay circuit 12 and will operate the relay 14 to closed condition, thus completing a circuit including the signal 16 and the source of electrical energy 18.

While I have described and illustrated only one embodiment of the invention it will be understood by those skilled in the art that other embodiments, as well as modifications of that disclosed, may be made and practised without departing in any way from the spirit or scope of the invention, for the limits of which reference must be made to the appended claims.

What is claimed is:
1. A system for indicating the presence of flame in a space to be monitored, comprising a continuous type sensing element adapted to be positioned within said space, said sensing element being insulated from ground and being unenergized and being formed of a material which when heated to a predetermined degree emits electrons sufficiently to cause a thermionic current to flow therein, grounded amplifying means connected to said sensing element which are tuned to admit frequencies in the range of frequencies of the varying characteristics of flame whereby a current is caused to flow in said sensing element and said amplifier upon impingement of a flame on said sensing element and ground, an indicating device, and means connecting the amplifying means to the indicating device to cause the current output of the amplifying means to operate the indicating device to indicate the presence of flame at or adjacent the sensing element.

2. A system for indicating the presence of flame in a space to be monitored, comprising a continuous type sensing element adapted to be positioned within such space, said sensing element being insulated from ground when operatively positioned within such space and being unenergized and being formed of a material which when heated to a predetermined degree emits electrons sufficiently to cause a thermionic current to flow therein, grounded amplifying means connected to said sensing element which are tuned to admit frequencies in the range of frequencies of the varying characteristics of flame whereby a current is caused to flow in said sensing element and said amplifier upon impingement of a flame on said sensing element and ground, an indicating device and means connecting the amplifying means to the indicating device to cause the current output of the amplifying means to operate the indicating device to indicate the presence of flame at or adjacent the sensing element, the means connecting the amplifying means to the indicating device including means for screening out extraneous noise of lower amplitude than the signal produced by electron emission in the sensing element and also including other means for screening out sporadic signals such as those produced by lightning and the like in distinction to steady signals such as those produced by the effect of flame on the sensing element.

References Cited in the file of this patent
UNITED STATES PATENTS

| | | |
|---|---|---|
| 2,455,350 | Beam | Dec. 7, 1947 |
| 2,478,373 | Dahline | Aug. 9, 1949 |
| 2,553,420 | McFee | May 15, 1951 |
| 2,697,824 | Norton et al. | Dec. 21, 1954 |
| 2,766,440 | Marsden | Oct. 9, 1956 |
| 2,811,711 | Cade | Oct. 29, 1957 |